United States Patent
Nguyen et al.

(10) Patent No.: US 10,308,002 B2
(45) Date of Patent: Jun. 4, 2019

(54) BONDLINE CONTROL ADHESIVE SPACER

(71) Applicant: The Boeing Company, Chicago, IL (US)

(72) Inventors: Thompson Nguyen, Tukwila, WA (US); Michael W. Evens, Burren, WA (US); Michael S. Goodrich, Long Beach, CA (US); Lindsay R. Calhoun, Norman, OK (US); Richard A. Binder, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/603,200

(22) Filed: May 23, 2017

(65) Prior Publication Data
US 2018/0339502 A1    Nov. 29, 2018

(51) Int. Cl.
*B32B 37/12*     (2006.01)
*B32B 37/10*     (2006.01)
*B32B 38/00*     (2006.01)
*B32B 7/12*      (2006.01)

(52) U.S. Cl.
CPC ............. *B32B 37/12* (2013.01); *B32B 7/12* (2013.01); *B32B 37/1018* (2013.01); *B32B 38/0004* (2013.01); *B32B 2305/72* (2013.01)

(58) Field of Classification Search
CPC ....................................................... B32B 37/12
USPC ............................................................. 428/77
See application file for complete search history.

(56) References Cited

U.S. PATENT DOCUMENTS

2010/0276065 A1 * 11/2010 Blanchard ............. B29C 65/483
                                                                156/94

* cited by examiner

*Primary Examiner* — Brent T O'Hern
(74) *Attorney, Agent, or Firm* — Kunzler Bean & Adamson

(57) ABSTRACT

Disclosed herein is a method of bonding a first part to a second part to form an assembly. The method includes positioning a plurality of adhesive spacers between the first part and the second part. Each adhesive spacer is made of a first curable adhesive in a cured state. The method further includes positioning at least one adhesive layer between the plurality of adhesive spacers and the first part and between the plurality of adhesive spacers and the second part. Each adhesive layer is made of the same first curable adhesive as the plurality of adhesive spacers, but in a non-cured state. The method further includes with the plurality of adhesive spacers between the first part, the second part, and the adhesive layers, curing the first part, the second part, and the adhesive layers.

15 Claims, 8 Drawing Sheets

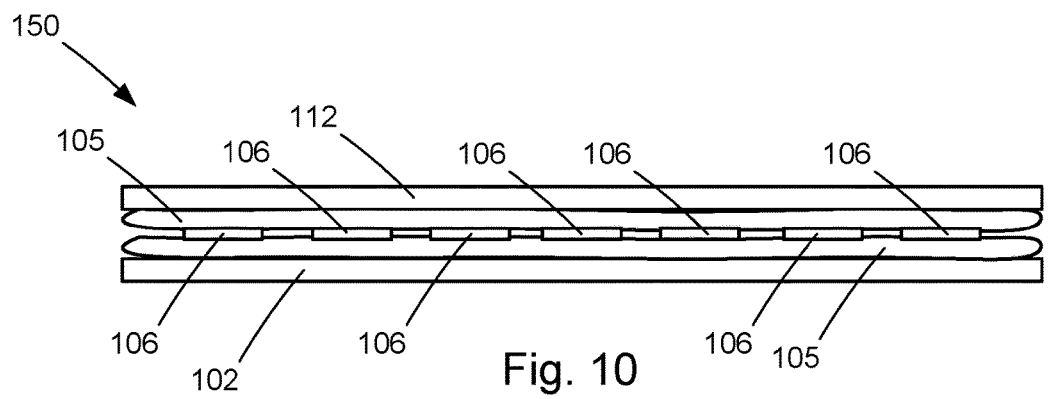
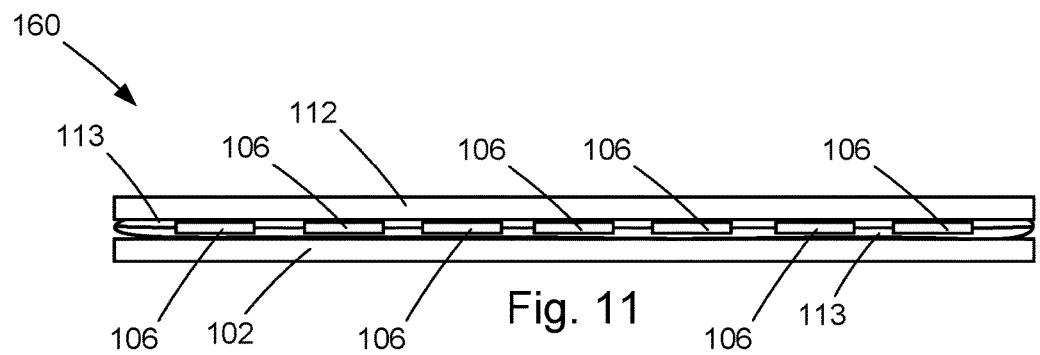

BONDLINE CONTROL ADHESIVE SPACER

GOVERNMENT LICENSE RIGHTS

This invention was made with Government support under Contract No. EA 14-STRC-11178 awarded by Department of Defense. The Government has certain rights in this invention.

FIELD

This disclosure relates generally to bonds in an assembly, and more particularly to a bondline control adhesive spacer made of the same material as an adhesive material.

BACKGROUND

Often, spacers are utilized to maintain a consistent thickness of bonding adhesive between two parts or two plies of a multi-ply part. However, some spacer materials and configurations may result in non-uniform bondline stiffness, may negatively affect the capability of the bondline to carry and distribute operational loads, and may be the origin of defects in a finished part.

SUMMARY

The subject matter of the present application has been developed in response to the present state of the art, and in particular, in response to the problems and disadvantages associated with current spacers for multi-ply parts that have not yet been fully solved by currently available techniques. Accordingly, the subject matter of the present application has been developed to provide apparatuses, methods, and systems that overcome at least some of the above-discussed shortcomings of prior art techniques. More specifically, in one implementation, bondline control adhesive spacers, which are made from the same material(s) as the adhesive material and provide for uniform stiffness and even distribution of operational loads, are disclosed.

Disclosed herein is a method of bonding a first part to a second part to form an assembly. The method includes positioning a plurality of adhesive spacers between the first part and the second part. Each adhesive spacer is made of a first curable adhesive in a cured state. The method further includes positioning at least one adhesive layer between the plurality of adhesive spacers and the first part and between the plurality of adhesive spacers and the second part. Each adhesive layer is made of the same first curable adhesive as the plurality of adhesive spacers, but in a non-cured state. The method further includes with the plurality of adhesive spacers between the first part, the second part, and the adhesive layers, curing the first part, the second part, and the adhesive layers. The preceding subject matter of this paragraph characterizes example 1 of the present disclosure.

The method includes vacuum compacting the first part, the second part, the plurality of adhesive spacers, and the adhesive layers prior to curing. The preceding subject matter of this paragraph characterizes example 2 of the present disclosure, wherein example 2 also includes the subject matter according to example 1, above.

The method includes producing the plurality of adhesive spacers by vacuum compacting at least one spacer adhesive sheet comprising the first curable adhesive in a non-cured state to produce a compressed adhesive stack. The preceding subject matter of this paragraph characterizes example 3 of the present disclosure, wherein example 3 also includes the subject matter according to any one of examples 1-2, above.

The method includes curing the compressed adhesive stack to produce a cured adhesive stack. The preceding subject matter of this paragraph characterizes example 4 of the present disclosure, wherein example 4 also includes the subject matter according to example 3, above.

The method includes cutting the plurality of adhesive spacers, in a desired shape, out of the cured adhesive stack. The preceding subject matter of this paragraph characterizes example 5 of the present disclosure, wherein example 5 also includes the subject matter according to example 4, above.

The method includes mechanically reducing a thickness of the plurality of adhesive spacers to a desired thickness. The preceding subject matter of this paragraph characterizes example 6 of the present disclosure, wherein example 6 also includes the subject matter according to any one of examples 4-5, above.

The method further includes determining a shape, size, pattern, or spacing of the plurality of adhesive spacers. The preceding subject matter of this paragraph characterizes example 7 of the present disclosure, wherein example 7 also includes the subject matter according to any one of examples 1-6, above.

Determining the shape, size, pattern, or spacing of the plurality of adhesive spacers is based upon the flexibility of the first part or the second part. The preceding subject matter of this paragraph characterizes example 8 of the present disclosure, wherein example 8 also includes the subject matter according to example 7, above.

Determining the shape, size, pattern, or spacing of the plurality of adhesive spacers is based upon a pressure to be applied to the laminate stack while curing. The preceding subject matter of this paragraph characterizes example 9 of the present disclosure, wherein example 9 also includes the subject matter according to any one of examples 7-8, above.

Determining the shape, size, pattern, or spacing of the plurality of adhesive spacers is based upon a maximum and a minimum acceptable space between the first part and the second part after the curing of the laminate stack. The preceding subject matter of this paragraph characterizes example 10 of the present disclosure, wherein example 10 also includes the subject matter according to any one of examples 7-9, above.

Determining the shape, size, pattern, or spacing of the plurality of adhesive spacers is based upon an estimated deformation of the first part and the second part that occurs during curing. The preceding subject matter of this paragraph characterizes example 11 of the present disclosure, wherein example 11 also includes the subject matter according to any one of examples 7-10, above.

The method includes determining a thickness of a bond to be established between the first part and the second part and an acceptable margin of error. The preceding subject matter of this paragraph characterizes example 12 of the present disclosure, wherein example 12 also includes the subject matter according to any one of examples 1-11, above.

The method includes determining a quantity of the at least one spacer adhesive sheet by dividing a determined thickness of a bond to be established between the first sheet of material and the second sheet of material by a thickness of one sheet of cured adhesive material and adding one if a quotient is not substantially equal to a whole number. The preceding subject matter of this paragraph characterizes example 13 of the present disclosure, wherein example 13 also includes the subject matter according to any one of examples 3-12, above.

Disclosed herein is a cured laminate stack according to one or more examples of the present disclosure. The cured laminate stack includes a first part, a second part, and an adhesive layer positioned between the first part and the second part. The adhesive layer includes a plurality of adhesive spacers distributed in a cured adhesive. The plurality of adhesive spacers and the cured adhesive are a same material. The adhesive layer further includes a discernible boundary between the plurality of adhesive spacers and the cured adhesive. The preceding subject matter of this paragraph characterizes example 14 of the present disclosure.

The plurality of adhesive spacers is distributed within the cured adhesive in an ordered array. The preceding subject matter of this paragraph characterizes example 15 of the present disclosure, wherein example 15 also includes the subject matter according to example 14, above.

The cured adhesive adheres to the plurality of adhesive spacers. The preceding subject matter of this paragraph characterizes example 16 of the present disclosure, wherein example 16 also includes the subject matter according to any one of examples 14 or 15, above.

The plurality of adhesive spacers is cured prior to a curing of the cured adhesive. The preceding subject matter of this paragraph characterizes example 17 of the present disclosure, wherein example 17 also includes the subject matter according to any one of examples 14-16, above.

A curing of the plurality of adhesive spacers and a curing of the cured adhesive occur separately. The preceding subject matter of this paragraph characterizes example 18 of the present disclosure, wherein example 18 also includes the subject matter according to any one of examples 14-17, above.

Disclosed herein is a method of bonding a first part to a second part according to one or more examples of the present disclosure. The method includes curing a compressed adhesive stack comprising a first curable adhesive to produce a cured adhesive stack, and cutting a plurality of adhesive spacers from the cured adhesive stack to a desired shape and thickness. The method further includes positioning the plurality of adhesive spacers between at least two adhesive sheets and vacuum compacting the plurality of adhesive spacers and the adhesive sheets to produce a compressed film adhesive. Each adhesive layer is made of the same first curable adhesive as the plurality of adhesive spacers, but in a non-cured state. The method further includes positioning the compressed film adhesive between the first part and the second part and with the compressed film adhesive between the first part and the second part, curing the first part, the second part, and the compressed film adhesive. The preceding subject matter of this paragraph characterizes example 19 of the present disclosure.

The method includes vacuum compacting the first part, the second part, and the compressed film adhesive prior to curing the first part, the second part, and the compressed film adhesive. The membrane is attached to the anchor. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 10 is a side view of an assembly, according to one or more embodiments of the present disclosure.

FIG. 11 is a side view of a compressed laminate stack, according to one or more embodiments of the present disclosure;

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Referring to FIGS. 1-4, a process for making bondline control adhesive spacers 106, for later use in an assembly, according to one or more embodiments is depicted pictorially. The adhesive spacers 106 are used as spacers between two parts or sheets bonded together to form an entirety or a portion of an assembly. When bonding together stiff structural plies (e.g., fiber-reinforced polymer plies) of an assembly using an adhesive, obtaining a desired and uniform bondline thickness between the plies helps to improve the strength of the bond and the overall strength of the laminate stack. The adhesive spacers 106, when positioned between parts or plies of a laminate stack, promote a consistent thickness of an adhesive between the parts. Conventional spacers are typically made of a material different from the adhesive, which can damage, impair, harm, or otherwise produce undesirable results (e.g., corrosion or localized stresses), because the spacer material may react to operating conditions (e.g., loads, temperatures, etc.) differently than the adhesive material. According to the present disclosure, incompatibility between the spacers and the adhesive material is reduced or even eliminated by utilizing the same material for each.

As disclosed herein the adhesive spacers 106, being made of the same material as the adhesive used to bond two parts together, promotes consistency and strength in the laminate stack. For example, as the laminate stack is subjected to stress, heat, wear and tear, and the like, the adhesive spacers 106 and the adhesive will respond to such stimuli in a similar manner, which will result in a more consistent final product.

Figure 1:
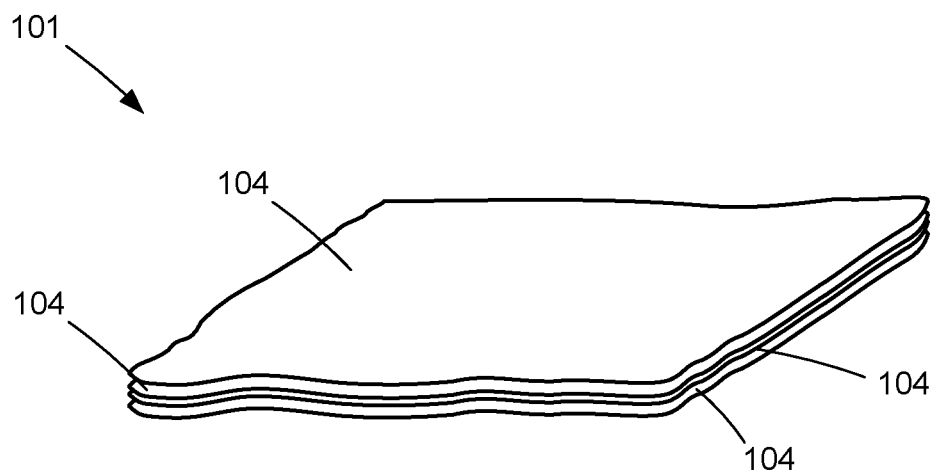
FIG. 1 is a perspective view of a plurality of spacer adhesive sheets overlaying one another in a pre-compacted and pre-cured state, according to one or more embodiments of the present disclosure.

Referring to FIG. 1, multiple spacer adhesive sheets 104 are shown in an overlaying manner. The spacer adhesive sheets 104 are made of an adhesive material in a non-cured state. The spacer adhesive sheets 104 will determine a thickness of the adhesive spacers 106 as more spacer adhesive sheets 104 will result in a thicker cured adhesive stack 114. Although four spacer adhesive sheets 104 are shown, the adhesive spacers 106 may be formed with fewer or more than four spacer adhesive sheets 104. For example, the adhesive spacers 106 may be formed from a single spacer adhesive sheet 104. Using multiple stacked layers helps to create adhesive spacers 106 of a desired thickness based on the desired bondline thickness. The adhesive can be any of various adhesive materials capable of being cured. For example, in one implementation, the adhesive is a thermoset plastic material. In some embodiments, the adhesive material is an epoxy film adhesive. In some implementations, the adhesive material is a modified epoxy film adhesive, such as, for example, EA 9696 modified epoxy film adhesive.

Figure 2:
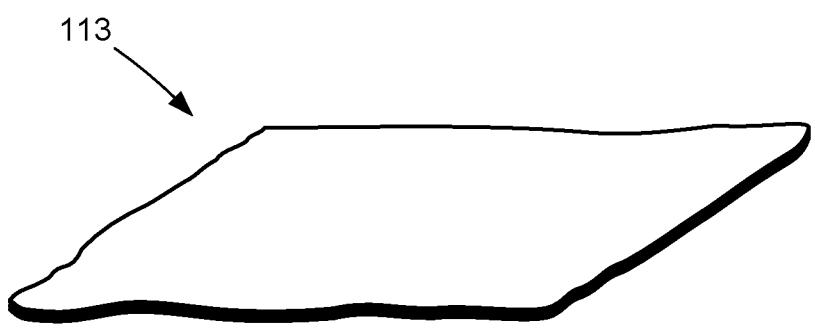
FIG. 2 is a perspective view of a compressed adhesive stack, according to one or more embodiments of the present disclosure.

Referring to FIG. 2, the spacer adhesive sheets 104 are shown after the spacer adhesive sheets 104 have been vacuum compacted to produce a compact adhesive stack 113. The spacer adhesive sheets 104 are compressed by a vacuum compacter in one implementation. The spacer adhesive sheets 104 may be compressed by other means to produce a compact adhesive stack 113.

Figure 3:
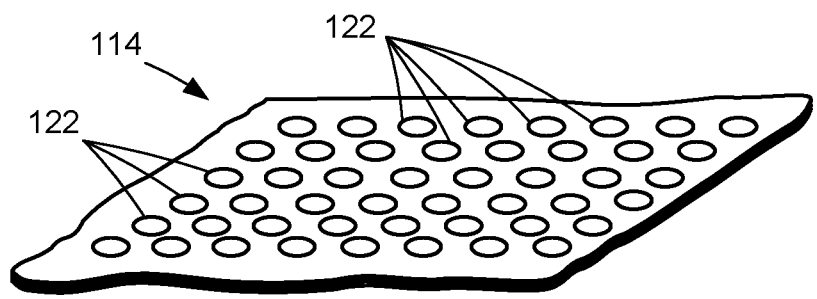
FIG. 3 is a perspective view of a cured adhesive stack with incisions cut into the cured adhesive stack, according to one or more embodiments of the present disclosure.
Figure 4:
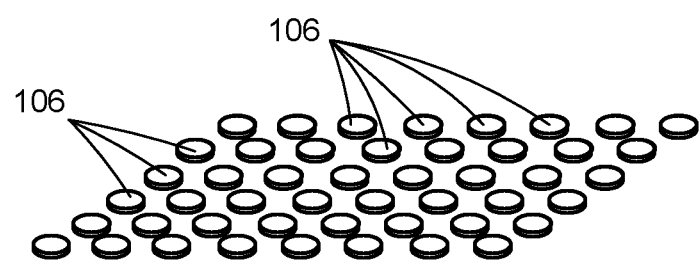
FIG. 4 is a perspective view of a plurality of adhesive spacers cut from the cured adhesive stack, according to one or more embodiments of the present disclosure.

Referring to FIG. 3, the compact adhesive stack 113 is cured to produce a cured adhesive stack 114. The compact adhesive stack 113 is cured in an autoclave or in another type of heating environment or device. In some implementations, the compact adhesive stack 113 is cured by a portable heat source, for example, for in situ bonding.

Cuts 122 are made to the cured adhesive stack 114 to form the adhesive spacers 106 from the cured adhesive stack 114. The adhesive spacers 106 are circular disk shaped spacers made from the adhesive material. The adhesive spacers 106 may be cut to produce regular or irregular shapes other than circular disk shaped spacers. The shape and size of the adhesive spacers 106 may be determined by any of a number of factors.

After the adhesive spacers 106 are cut to a desired shape, the adhesive spacers 106 can be sanded down to a desired thickness associated with a desired bondline thickness. The adhesive spacers 106 may be reduced to a desired thickness by sanding, skiving, cutting, shaving, or any of other known ways of reducing the thickness of a cured adhesive material. In some implementations, the cured adhesive stack 114 is reduced to a desired thickness by sanding, skiving, cutting, shaving, or any of other known ways of reducing the thickness of a cured adhesive material prior to cutting out the adhesive spacers 106. After reducing the thickness of the adhesive spacers 106 or the cured adhesive stack 114, the surface of the adhesive spacers 106 or the cured adhesive stack 114 may undergo further preparations for bonding. In some embodiments, the adhesive spacers 106 may be made of an adhesive paste that is cured into a desired shape or cured and cut into a desired shape.

Referring to FIGS. 5-11, a process of bonding together two parts to form a cured laminate stack 170 according to one or more embodiments is shown pictorially. A first part 102 is to be bonded to a second part 112. The first and second parts 102, 112 may be made of the same material(s) or of a different material(s). The two parts may each be any combination of single plies, multiple plies already bonded together or laminates, sandwich core structures, solid structures, laminated composites, honeycomb core details, etc. For example, the first part 102 and the second part 112 may each be a laminate including multiple plies of materials (e.g., carbon fiber reinforced polymer, fiberglass, para-aramid synthetic fiber, etc.) bonded together. In such embodiments, the laminates are bonded together by the methods described herein.

Figure 5:
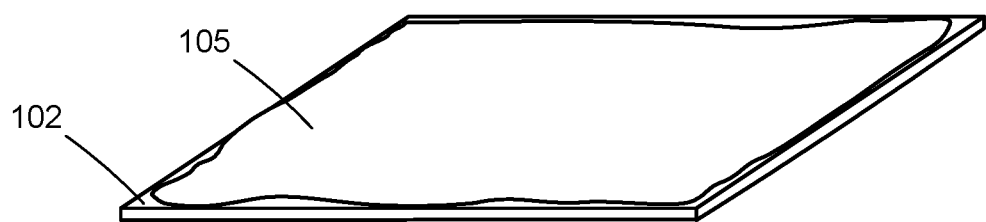
FIG. 5 is a perspective view of an adhesive sheet overlaying a first part, according to one or more embodiments of the present disclosure.

Referring to FIG. 5, an adhesive layer is placed on the first part 102. The adhesive layer is a first adhesive sheet 105. The adhesive sheet 105 is made from a curable adhesive material in a non-cured state. More specifically, the adhesive sheet 105 is made of the same curable adhesive material as the spacer adhesive sheets 104. In some embodiments, the adhesive material is an epoxy film adhesive. In some implementations, the adhesive material is a modified epoxy film adhesive, such as, for example, EA 9696 modified epoxy film adhesive. Although depicted as a single adhesive sheet 105, a quantity of more than one adhesive sheet 105 may be used.

Figure 6:
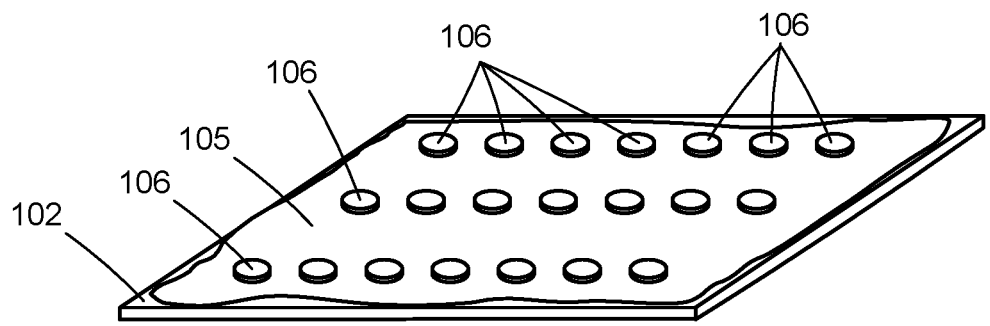
FIG. 6 is a perspective view of a plurality of adhesive spacers overlaying the adhesive sheet and the first part, according to one or more embodiments of the present disclosure.

Referring to FIG. 6, the adhesive spacers 106 are placed on the adhesive sheet 105. The adhesive spacers 106 are overlayed in an arrayed configuration on the adhesive sheet 105. The adhesive spacers 106 are distributed in a square grid array. In some implementations, the adhesive spacers 106 are distributed in a triangular grid array. In some implementations, the adhesive spacers 106 are distributed in a hexagonal grid array. In some implementations, the adhesive spacers 106 are distributed evenly along only the edge of the adhesive sheet 105. The number, spacing, pattern, shape and size of the adhesive spacers 106 may be determined by any of a number of factors.

Figure 7:
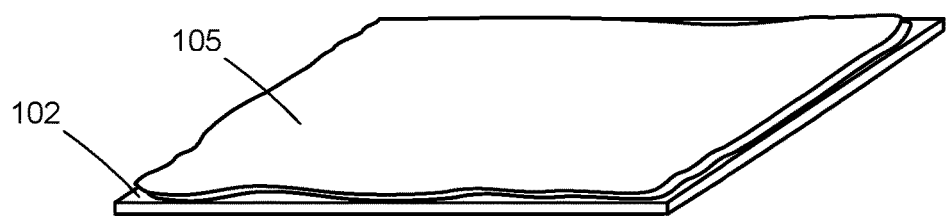
FIG. 7 is a perspective view of a second adhesive sheet overlaying the the plurality of adhesive spacers, the first adhesive sheet and the first part, according to one or more embodiments of the present disclosure.

Referring to FIG. 7, another adhesive sheet 105 is placed overlaying the adhesive spacers 106. The adhesive spacers 106 are now sandwiched between the two adhesive sheets 105.

Although shown as two adhesive sheets 105, the quantity of adhesive sheets 105 used may be determined in any of a number of ways. In some implementations, the quantity of adhesive sheets 105 above the adhesive spacers 106 is the same as the quantity of adhesive sheets 105 below the adhesive spacers. In some implementations, the quantity of adhesive sheets 105 above the adhesive spacers 106 is different from the quantity of adhesive sheets 105 below the adhesive spacers 106.

In some implementations, the quantity of adhesive sheets 105 used is one. In such an implementation, the single adhesive sheet 105 may be either above or below the adhesive spacers. In some implementations, the quantity of adhesive sheets 105 is one-half the quantity of spacer adhesive sheets 104 used to produce the adhesive spacers. In some implementations, the quantity of adhesive sheets 105 is less than one-half the quantity of spacer adhesive sheets 104 used to produce the adhesive spacers 106. In some implementations, the quantity of adhesive sheets 105 is more than one-half the quantity of spacer adhesive sheets 104 used to produce the adhesive spacers.

In some embodiments, the quantity of adhesive sheets 105 used is the same as the quantity of spacer adhesive sheets 104 used to produce the adhesive spacers 106. In some implementations, the exactly half of the quantity of adhesive sheets 105 are below the adhesive spacers 106 and the other half of the quantity of adhesive sheets 105 are above the adhesive spacers 106.

In the above description, the adhesive layers are adhesive sheets 105. In some embodiments, an adhesive paste is used as the adhesive layer(s) instead of the adhesive sheets 105 described above. In such embodiments, the adhesives spacers 106 used are a cured form of the adhesive paste. The adhesive spacers 106 are distributed within throughout the adhesive paste in between the first and second parts 102, 112, for example, in an array configuration.

Figure 8:
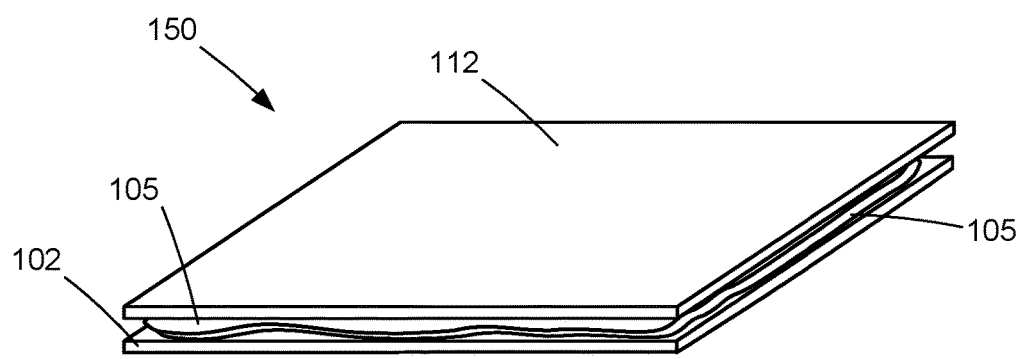
FIG. 8 is a perspective view of a second part overlaying the second adhesive sheet, the plurality of adhesive spacers, the first adhesive sheet and the first part, according to one or more embodiments of the present disclosure.
Figure 9:
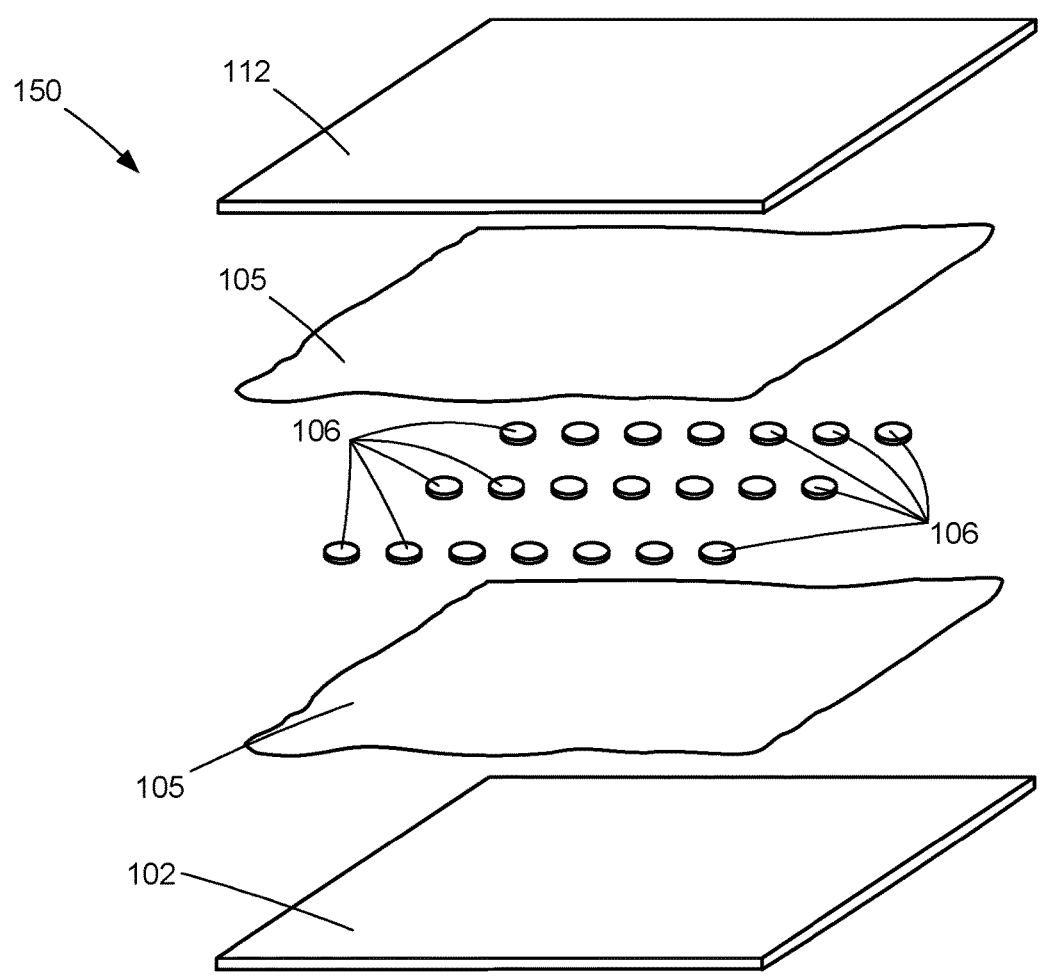
FIG. 9 is an exploded perspective view of an assembly, according to one or more embodiments of the present disclosure.

Referring to FIG. 8, the second part 112 to be bonded is placed on the second adhesive sheet 105. The resulting stack or intercoupling forms an assembly 150. Referring to FIG. 9, an exploded view of the assembly 150 is shown. Referring to FIG. 10, a side view of the assembly 150 is shown. The assembly 150 depicts the first part 102, the second part 112, with adhesive sheets 105 between the first part 102 and the second part 112. Additionally, adhesive spacers 106 are distributed between the two adhesives sheets 105.

Referring to FIG. 11, the assembly 150 is shown after the assembly 150 has been vacuum-compacted to produce a compressed assembly 160. The compressed assembly 160 depicts the first part 102, the second part 112, with a compressed adhesive stack 113 including adhesive spacers 106 distributed therein between the first part 102 and the second part 112.

In some implementations, the adhesive sheets 105 and the adhesive spacers 106 are vacuum compacted separately from the first part 102 and the second part 112 to produce a compressed film adhesive. In such implementations, the compressed film adhesive is positioned between the first part 102 and the second part 112. Such an assembly may then be cured. In some implementations, the assembly may be further vacuum-compacted with the first part 102 and the second part 112 prior to curing the assembly.

Figure 12:
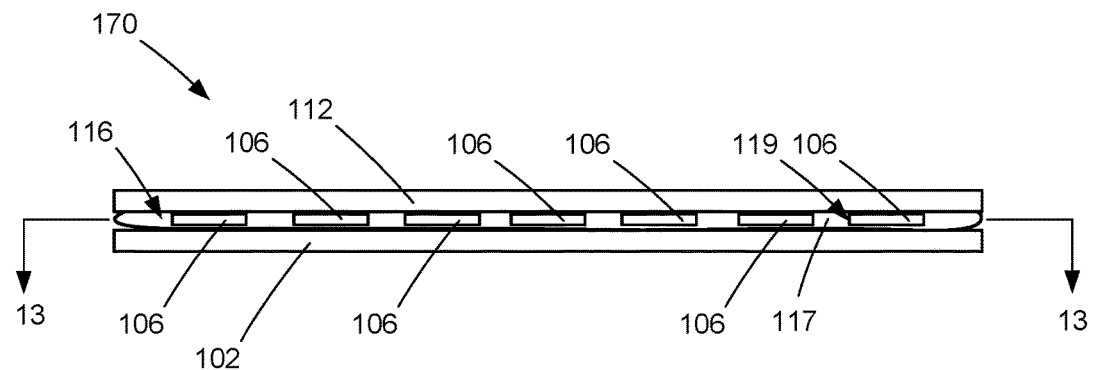
FIG. 12 is a side view of a cured laminate stack, according to one or more embodiments of the present disclosure.
Figure 13:
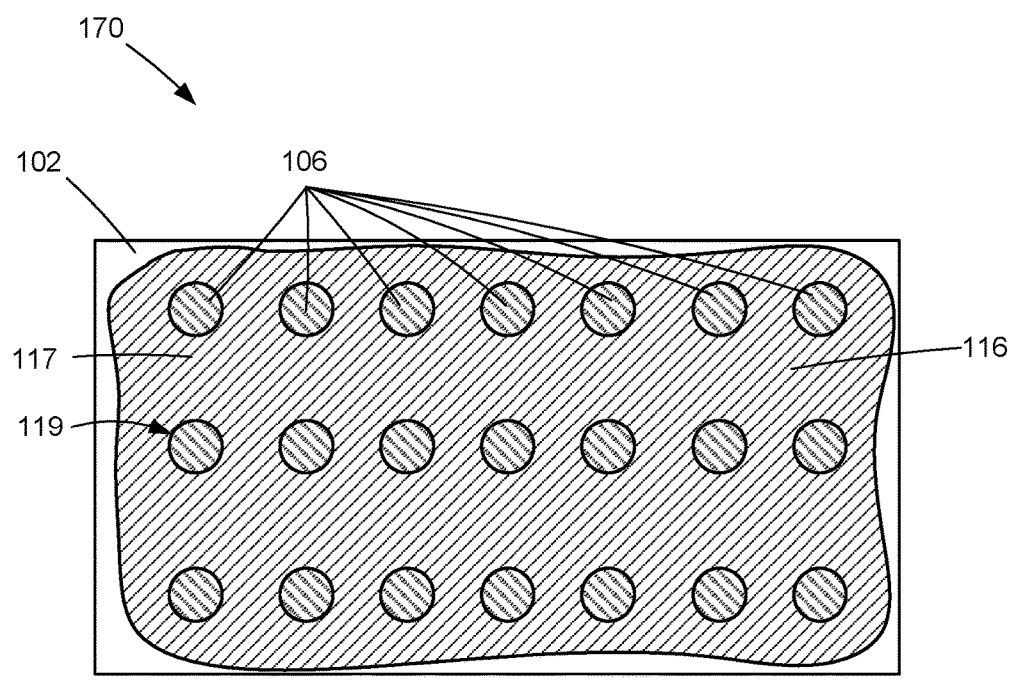
FIG. 13 is a cut-away top view of a cured laminate stack, according to one or more embodiments of the present disclosure.

Referring to FIG. 12, a cured assembly 170 is shown. The compressed assembly 160 is cured to produce the cured assembly 170. In some implementations, the compressed assembly 160 is further compressed or compacted during the curing process. The assembly 150 may be compressed under a vacuum (e.g., in a vacuum bag) or positive pressure (e.g. air bladder, clamps) or other mechanical compression. The cured assembly 170 depicts a first part 102 and a second part 112 with an adhesive layer 116 bonding the first part 102 to the second part 112. The adhesive layer 116 includes the curable adhesive in a cured state (referred to as cured adhesive 117) with adhesive spacers 106 distributed therein. The cured adhesive 117 and the adhesive spacers 106 are a same cured material. The curing of the adhesive spacers 106 and the curing of the cured adhesive 117 occur separately or at separate times. In other words, the adhesive spacers 106 were cured prior to the curing of the cured adhesive 117. While the adhesive spacers 106 and the cured adhesive 117 are the same cured material, there exists a boundary 119 discernible between the adhesive spacers 106 and the cured adhesive 117. The boundary 119 exists because the adhesive spacers 106 are in an already cured state when the curable adhesive is cured to form the cured adhesive 117. The boundary of the already cured adhesive spacers 106 will not flow into the cured adhesive 117. The resulting boundary 119 may be discernible upon inspection. In some implementations, the vacuum-compacted assembly 160 is further compressed during the curing process.

In some implementations, the cured adhesive 117 completely surrounds the adhesive spacers 106. In other words, there is cured adhesive 117 between the first part 102 and the adhesive spacers 106 as well as between the second part 112 and the adhesive spacers 106. The cured adhesive 117 bonds the first part 102 to the adhesive spacers 106 as well as the second part 112 to the adhesive spacers 106. In some implementations, the cured adhesive 117 is only distributed around a perimeter of the adhesive spacers 106 but not on the top and bottom of the adhesive spacers 106. In such implementations, the adhesive bonding material 116 adheres to the sides of the adhesive spacers 106. In some implementations, the cured adhesive 117 is only distributed around a perimeter of the adhesive spacers 106 and on only one of the top and bottom of the adhesive spacers 106.

Referring to FIG. 12, a cut-away at the second layer of the cured assembly 170 is shown from a top view. The adhesive spacers 106 are distributed within the cured adhesive 117. In some implementations, the adhesive spacers 106 are distributed within the cured adhesive 117 in an ordered array. In some implementations, the adhesive spacers 106 are distributed within the cured adhesive 117 only at the edges. The adhesive spacers 106 may be distributed in a regular or irregular pattern.

The shape, size, pattern, or spacing of the adhesive spacers 106 may be determined based on any of a number of parameters or combination of parameters. For example, the various parameters can be one or more of the physical properties of the first part 102 or the second part 112, the flexibility of the first part 102 or the second part 112, the parameter of use of the cured assembly 170, a pressure to be applied to the assembly while curing, a maximum and/or a minimum acceptable space between the first part 102 and the second part 112 after the curing of the assembly, and/or an estimated deformation of the first part 102 and the second part 112 that occurs during curing.

In some implementations, to determine the shape, size, pattern, or spacing of the adhesive spacers 106 requires determining a thickness of a bond to be established between the first part 102 and the second part 112 and an acceptable margin of error. Determining the thickness of the bond to be established between the first part 102 and the second part 112 also may determine the quantity of spacer adhesive sheets 104 to be used to produce the adhesive spacers 106. In some implementations, the quantity of spacer adhesive sheets 104 to be used to produce the adhesive spacers 106 is determined by dividing a determined thickness of a bond to be established between the first part 102 and the second part 112 by a thickness of one spacer adhesive sheet 104 and adding one if a quotient is not substantially equal to a whole number.

Figure 14:
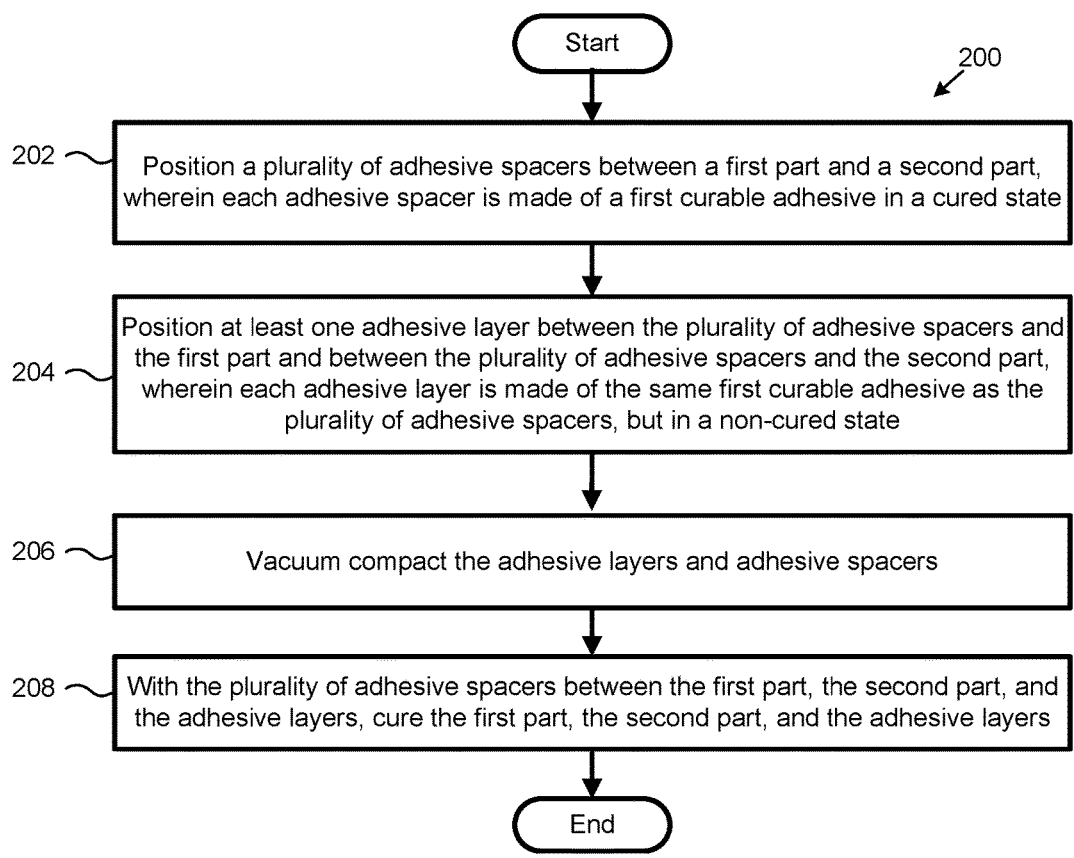
FIG. 14 is a schematic flow diagram of a method of bonding a first part to a second part to form an assembly, according to one or more embodiments of the present disclosure.

Now referring to FIG. 14, one embodiment of a method 200 of bonding a first part to a second part to form an assembly is shown. The method 200 includes positioning a plurality of adhesive spacers between the first part and the second part, wherein each adhesive spacer is made of a first curable adhesive in a cured state at 202. At 204, the method 200 includes positioning at least one adhesive layer between the plurality of adhesive spacers and the first part and between the plurality of adhesive spacers and the second part, wherein each adhesive layer is made of the same first curable adhesive as the plurality of adhesive spacers, but in a non-cured state. The method 200 additionally includes vacuum compacting at least the adhesive layers and the adhesive spacers at 206 in some implementations. At 208, the method includes with the plurality of adhesive spacers between the first part, the second part, and the adhesive layers, curing the first part, the second part, and the adhesive layers at 208. The method then ends.

In some embodiments, a method of bonding a first part to a second part to form an assembly includes curing a compressed adhesive stack comprising a first curable adhesive to produce a cured adhesive stack. In some embodiments, method further includes cutting a plurality of adhesive spacers from the cured adhesive stack to a desired shape and thickness. In some embodiments, method further includes positioning the plurality of adhesive spacers between at least two adhesive sheets. In some embodiments, method further includes vacuum compacting the plurality of adhesive spacers and the adhesive sheets to produce a compressed film adhesive, wherein each adhesive layer is made of the same first curable adhesive as the plurality of adhesive spacers, but in a non-cured state. In some embodiments, the method further includes positioning the compressed film adhesive between the first part and the second part. In some embodiments, method further includes with the compressed film adhesive between the first part and the second part, curing the first part, the second part, and the compressed film adhesive. Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of bonding a first part to a second part to form an assembly, comprising:
   positioning a plurality of adhesive spacers between the first part and the second part, wherein each adhesive spacer is made of a first curable adhesive in a cured state;
   positioning at least one adhesive layer between the plurality of adhesive spacers and the first part and between the plurality of adhesive spacers and the second part, wherein each adhesive layer is made of the same first curable adhesive as the plurality of adhesive spacers, but in a non-cured state; and
   with the plurality of adhesive spacers between the first part, the second part, and the adhesive layers, curing the first part, the second part, and the adhesive layers.

2. The method according to claim 1, further comprising vacuum compacting the first part, the second part, the plurality of adhesive spacers, and the adhesive layers prior to curing.

3. The method according to claim 1, further comprising producing the plurality of adhesive spacers by vacuum compacting at least one spacer adhesive sheet comprising the first curable adhesive in a non-cured state to produce a compressed adhesive stack.

4. The method according to claim 3, further comprising curing the compressed adhesive stack to produce a cured adhesive stack.

5. The method according to claim 4, further comprising cutting the plurality of adhesive spacers, in a desired shape, out of the cured adhesive stack.

6. The method according to claim 5, further comprising mechanically reducing a thickness of the plurality of adhesive spacers to a desired thickness.

7. The method according to claim 1, further comprising determining a shape, size, pattern, or spacing of the plurality of adhesive spacers.

8. The method according to claim 7, wherein determining the shape, size, pattern, or spacing of the plurality of adhesive spacers is based upon the flexibility of the first part or the second part.

9. The method according to claim 7, wherein determining the shape, size, pattern, or spacing of the plurality of adhesive spacers is based upon a pressure to be applied to the assembly while curing.

10. The method according to claim 7, wherein determining the shape, size, pattern, or spacing of the plurality of adhesive spacers is based upon a maximum and a minimum acceptable space between the first part and the second part after the curing of the assembly.

11. The method according to claim 1, wherein the adhesive layers comprise an adhesive paste.

12. The method according to claim 1, further comprising determining a thickness of a bond to be established between the first part and the second part.

13. The method according to claim 3, further comprising determining a quantity of the at least one spacer adhesive sheet by dividing a determined thickness of a bond to be established between the first part and the second part by a thickness of one spacer adhesive sheet and adding one if a quotient is not substantially equal to a whole number.

14. A method of bonding a first part to a second part, comprising:
   curing a compressed adhesive stack comprising a first curable adhesive to produce a cured adhesive stack;
   cutting a plurality of adhesive spacers from the cured adhesive stack to a desired shape and thickness;
   positioning the plurality of adhesive spacers between at least two adhesive sheets;
   vacuum compacting the plurality of adhesive spacers and the adhesive sheets to produce a compressed film adhesive, wherein each adhesive sheet is made of the same first curable adhesive as the plurality of adhesive spacers, but in a non-cured state;
   positioning the compressed film adhesive between the first part and the second part; and
   with the compressed film adhesive between the first part and the second part, curing the first part, the second part, and the compressed film adhesive.

15. The method according to claim 14, further comprising compacting under vacuum or positive pressure the first part, the second part, and the compressed film adhesive prior to curing the first part, the second part, and the compressed film adhesive.

* * * * *